United States Patent Office 3,312,114
Patented Apr. 4, 1967

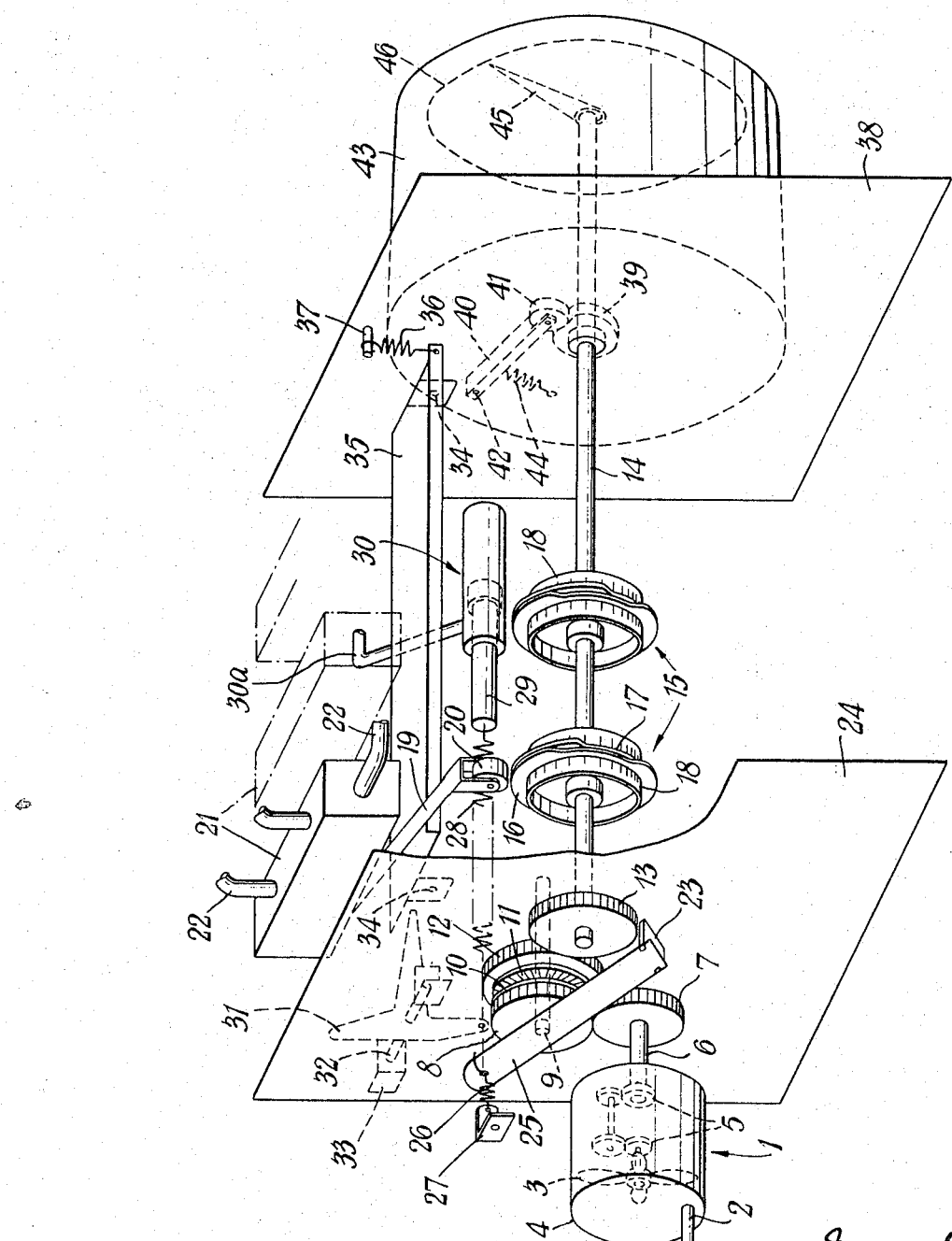

3,312,114
TIMERS
Jerzy Kazimierz Chuchla, Harlow New Town, England, assignor to Electrical Remote Control Company Limited, Essex, England, a British company
Filed Aug. 28, 1964, Ser. No. 392,894
Claims priority, application Great Britain, Aug. 30, 1963, 34,378/63
7 Claims. (Cl. 74—125.5)

According to the present invention, there is provided an automatic timer, comprising a miniature pneumatic motor, shaft means rotatable by said motor, a cam fixed to said shaft means for rotation therewith, a cam follower serving to co-operate wtih said cam, and a miniature pneumatic valve operatively associated with said cam follower for operation by said follower to control flow in a pneumatic pipeline.

In order that the invention may be clearly understood and readily carried into effect, reference will now be made, by way of example, to the accompanying drawing which shows a diagrammatic perspective view of an automatic timer.

Referring to the drawing, the timer includes a miniature pneumatic motor 1, to which compressed air is supplied through a tube 2. The jet of compressed air issuing from the tube 2 rotates a propeller 3 located inside the motor casing 4. The propeller 3 in turn rotates, through a gear train 5, a shaft 6 which has fixed thereto, externally of the casing 4, a gear wheel 7. The gear wheel 7 meshes with a gear wheel 8, which is fixed to a rotatable shaft 9 near to one end of the shaft and carries at one radial face a clutch lining 10 consisting of a resilient material, for example neoprene rubber. The clutch lining 10 cooperates with a ring of teeth 11 provided at a radial face of a gear wheel 12. The gear wheel 12 is freely mounted on the shaft 9 and meshes with a gear wheel 13 fixed to a timing cam shaft 14. There is a coil spring (not shown) between the gear wheels 8 and 12 tending to displace axially away from the gear wheel 12 the gear wheel 8, thereby to disengage the clutch parts 10 and 11. The shaft 14 has mounted thereon cams 15, of which each consists of two half-cams 16 and 17, which each carry a calibrated anular scale 18 indicating the angular position of the relevant half-cam. The half-cams 16 and 17 are angularly adjustable relatively to one another and to the shaft 14, thereby to permit adjustment of the angular positions of the camming profiles of the cams 15 and also alteration of the profiles themselves. Roller followers 19 having rollers 20 co-operate with the camming surfaces provided by the respective cams 15 (for ease of illustration, only one of the followers 19 is shown). The followers 19 operate respective, snap-action, miniature, pneumatic valves 21 which are inserted in pneumatic pipes 22 and serve to control the flow of air in the pipes 22.

Mounted on a projection 23 on a wall 24 is one end of a strip-form lever 25 which bears on the left-hand end of the shaft 9 and which has its other end connected via a tension spring 26 to a fixed bracket 27 and via a tension spring 28 to a piston 29 of a piston-and-cylinder device 30. A pipe 30a supplies compressed air to the device 30. The shaft 9 can move freely axially through a hole in the gear wheel 12 and through a hole or bush (not shown) in the wall 24. The tension springs 26 and 28 urge that other end of the lever 25 in opposite directions. Connected to the end of the spring 28 adjacent to the lever 25 is one arm of a three-arm lever 31 which is carried by a pivot pin 32 borne in brackets 33 fixed to the wall 24. A second arm of the three-arm lever is arranged to tilt, about pivots 34 fixed in the wall 24 and a wall 38 spaced from the wall 24, a plate 35 against the action of a tension spring 36. The plate 35 is arranged to pivot upwardly the followers 19 about the ends of the followers connected to the valves 21, and thus to lift the rollers 20 out of contact with the cams 15. One end of the tension spring 36 is connected to the plate 35, and the other end is connected to an anchor pin 37 fixed to the wall 38.

The shaft 14 has fixed thereto a cam 39 having a heart-shaped camming surface with which co-operates a roller follower 40 having a roller 41 at one end thereof. The other end of the roller follower 40 is pivoted at 42 to a rotatable drum 43. A tension spring 44 has one end attached to the drum 43 and the other end attached to a location on the follower 40 intermediate the ends of the follower. The spring 44 thus urges the roller 41 against the heart-shaped camming surface of the cam 39. Fixed to the end of the shaft 14 remote from the gear wheel 13 is a pointer 45 which moves over a scale 46, and which indicates the angular position of the shaft 14.

In operation, the motor 1 continuously drives the gear wheel 8. To engage the clutch 10, 11, air is supplied to the device 30 via the pipe 30a to cause the piston 29 to move to the right in the drawing. This produces tensioning of the spring 28 and thus produces engagement of the clutch 10, 11, because the lever 25 displaces the shaft 9 towards the right. Simultaneously with engagement of the clutch, the three-arm lever 31 tilts the plate 35 against the action of the spring 36, so that the rollers 20 are lowered on to the cams 15 and can follow the profiles of these cams. The cam followers 19 then operate the miniature valves 21 in a desired sequence. The disengagement of the clutch is produced by allowing the piston 29 to return to the left in the drawing under the action of the springs 26 and 28, so that the lever 25 moves away from the gear wheel 12 and is followed up by the shaft 9 under the action of the spring (not shown) interposed between the gearwheels 8 and 12. Simultaneously with disengagement of the clutch, the three-arm lever 31 is swung clockwise in the drawing so that the plate 35 is tilted back into its initial position by the spring 36, thereby lifting the rollers 20 out of contact with the camming surfaces of the cams 15. When the clutch is disengaged and the roller 41 is not at the cusp of the heart-shaped camming surface of the re-setting cam 39, the spring 44, by urging the roller 41 against the heart-shaped camming surface, causes the shaft 14 to return to an angular reset position predetermined by the angular position of the roller 41 around the shaft 14. Turning of the drum 43 about the axis of the shaft 14 changes the angular position of the spring 44 and follower 40 about the shaft, so that the angular reset position of the shaft 14 is also changed. Such turning of the drum 43 about the shaft 14 can be performed either manually, or can be effected by another pneumatic motor (not shown) connected to the drum 43 via toothing provided at the external periphery of the drum 43.

The present timer has the advantage that it can be used with much greater safety in an inflammable atmosphere than can an electrical timer, and that it is particularly convenient where no electrical power supply is available or where connection to an electrical supply is very costly.

The use of miniature, snap-action, pneumatic valves is advantageous in that their construction is such that, even if the timing cam shaft 14 revolves very slowly, the miniature, snap-action, pneumatic valves will either allow full passage of air in the pneumatic pipes 22 or will completely prevent such passage, any intermediate stages being of negligible duration. The advantage of provision of the plate 35 is that it facilitates resetting of the shaft 14 and that it prevents false control impulses being given to the pneumatic valves 21 during resetting of the cam shaft, because during resetting the rollers 20 do not bear on the cams 15.

Under certain circumstances, it may be possible to omit the clutch and the resetting arrangement and instead to drive the shaft 14 directly from the motor 1.

I claim:

1. An automatic timer, comprising a miniature pneumatic motor, a first shaft rotatable by said motor, a clutch input member fixed to said first shaft for rotation therewith, a clutch output member engageable with and disengageable from said clutch input member, a second shaft fixed to said clutch output member for rotation therewith, a cam fixed to said second shaft for rotation therewith, a displaceable cam follower serving to co-operate with said cam, a miniature pneumatic valve operatively associated with said cam follower for operation by said follower to control flow in a pneumatic pipeline, pneumatic clutch control means for automatically producing engagement and disengagement of said clutch output member and said clutch input member, and resetting means acting on said second shaft for automatically resetting said second shaft to a predetermined position when said clutch output member and said clutch input member are disengaged.

2. An automatic timer, comprising a miniature pneumatic motor, a first shaft rotatable by said motor, a clutch input member fixed to said first shaft for rotation therewith, a clutch output member engageable with and disengageable from said clutch input member, a second shaft fixed to said clutch output member for rotation therewith, a cam fixed to said second shaft for rotation therewith, a displaceable cam follower serving to co-operate with said cam, a miniature pneumatic valve operatively associated with said cam follower for operation by said follower to control flow in a pneumatic pipeline, a pneumatic piston-and-cylinder device of which the piston is connected to one of said input member and said output member for displacing said one of said input member and said output member into engagement with the other and maintaining them in engagement, and for subsequently permitting said one of said input member and said output member to disegage from the other, and resetting means acting on said second shaft for resetting said second shaft to a predetermined position when said clutch output member and said clutch input member are disengaged.

3. An automatic timer, comprising a miniature pneumatic motor, a first shaft rotatable by said motor, a clutch input member fixed to said first shaft for rotation therewith, a clutch output member engageable with and disengageable from said clutch input member, a second shaft fixed to said clutch output member for rotation therewith, a cam fixed to said second shaft for rotation therewith, a displaceable cam follower serving to co-operate with said cam, a miniature pneumatic valve operatively associated with said cam follower for operation by said follower to control flow in a pneumatic pipeline, clutch control means for automatically producing engagement and disengagement of said clutch output member and said clutch input member, releasable retaining means connected to said clutch control means and operatively associated with said cam follower for automatic operation by said control means to retain said follower out of co-operation with said cam when said input member and said output member are in the disengaged state and to allow said follower to co-operate with said cam when said input member and said output member are in the engaged state, and resetting means acting on said second shaft for automatically resetting said second shaft to a predetermined position when said clutch output member and said clutch input member are disengaged.

4. An automatic timer, comprising a miniature pneumatic motor, a first shaft rotatable by said motor, a clutch input member fixed to said first shaft for rotation therewith, a clutch output member engageable with and disengageable from said clutch input member, a second shaft fixed to said clutch output member for rotation therewith, a cam fixed to said second shaft for rotation therewith, a displaceable cam follower serving to co-operate with said cam, a miniature pneumatic valve operatively associated with said cam follower for operation by said follower to control flow in a pneumatic pipeline, clutch control means for producing engagement and disengagement of said clutch output member and said clutch input member, a resetting cam fixed to said second shaft, peripheral surface portions of said resetting cam forming a heart-shaped camming surface extending round said cam, a resetting cam follower co-operating with said camming surface, and urging means urging said resetting cam follower against said camming surface for thereby causing resetting of said second shaft to a predetermined angular position, corresponding to the position of said follower, when said clutch output member and said clutch input member are disengaged.

5. An automatic timer, comprising a miniature pneumatic motor, a first shaft rotatable by said motor, a clutch input member fixed to said first shaft for rotation therewith, a clutch output member engageable with and disengageable from said clutch input member, a second shaft fixed to said clutch output member for rotation therewith, a cam fixed to said second shaft for rotation therewith, a displaceable cam follower serving to co-operate with said cam, a miniature pneumatic valve operatively associated with said cam follower for operation by said follower to control flow in a pneumatic pipeline, clutch control means for producing engagement and disengagement of said clutch output member and said clutch input member, a resetting cam fixed to said second shaft, peripheral surface portions of said resetting cam forming a heart-shaped camming surface extending round said cam, a resetting cam follower co-operating with said camming surface, urging means urging said resetting cam follower against said camming surface for thereby causing resetting of said second shaft to a predetermined angular position, corresponding to the position of said follower, when said clutch output member and said clutch input member are disengaged, and supporting means turnable about the axis of said second shaft and supporting said resetting cam follower and said urging means for turning said cam follower and said urging means about said axis to adjust said predetermined angular position.

6. An automatic timer, comprising a miniature pneumatic motor, a clutch input member rotatable by said motor, a clutch output member engageable with and disengageable from said clutch input member, a shaft fixed to said clutch output member for rotation therewith, a cam fixed to said shaft for rotation therewith, a displaceable cam follower serving to co-operate with said cam, a miniature pneumatic valve operatively associated with said cam follower for operation by said follower to control flow in a pneumatic pipeline, and pneumatic clutch control means for automatically producing engagement and disengagement of said clutch means, and resetting means acting on said shaft for automatically resetting said shaft to a pre-determined position when said clutch output member and said clutch input member are disengaged.

7. An automatic timer according to claim 6, and further comprising portions of one of said input member and said output member comprised of a resilient material, and portions of the other of said input member and said output member defining teeth engageable in said resilient material.

(References on following page)

References Cited by the Examiner

UNITED STATES PATENTS

| | | | |
|---|---|---|---|
| 2,806,533 | 9/1957 | Fleck | 74—125.5 |
| 2,946,346 | 7/1960 | Mead | 137—624.17 |
| 2,952,249 | 9/1960 | Conover | 60—57 |

FOREIGN PATENTS 620,813   3/1949   Great Britain.

FRED C. MATTERN, Jr., *Primary Examiner.*

W. S. RATLIFF, *Assistant Examiner.*